Patented Mar. 16, 1954

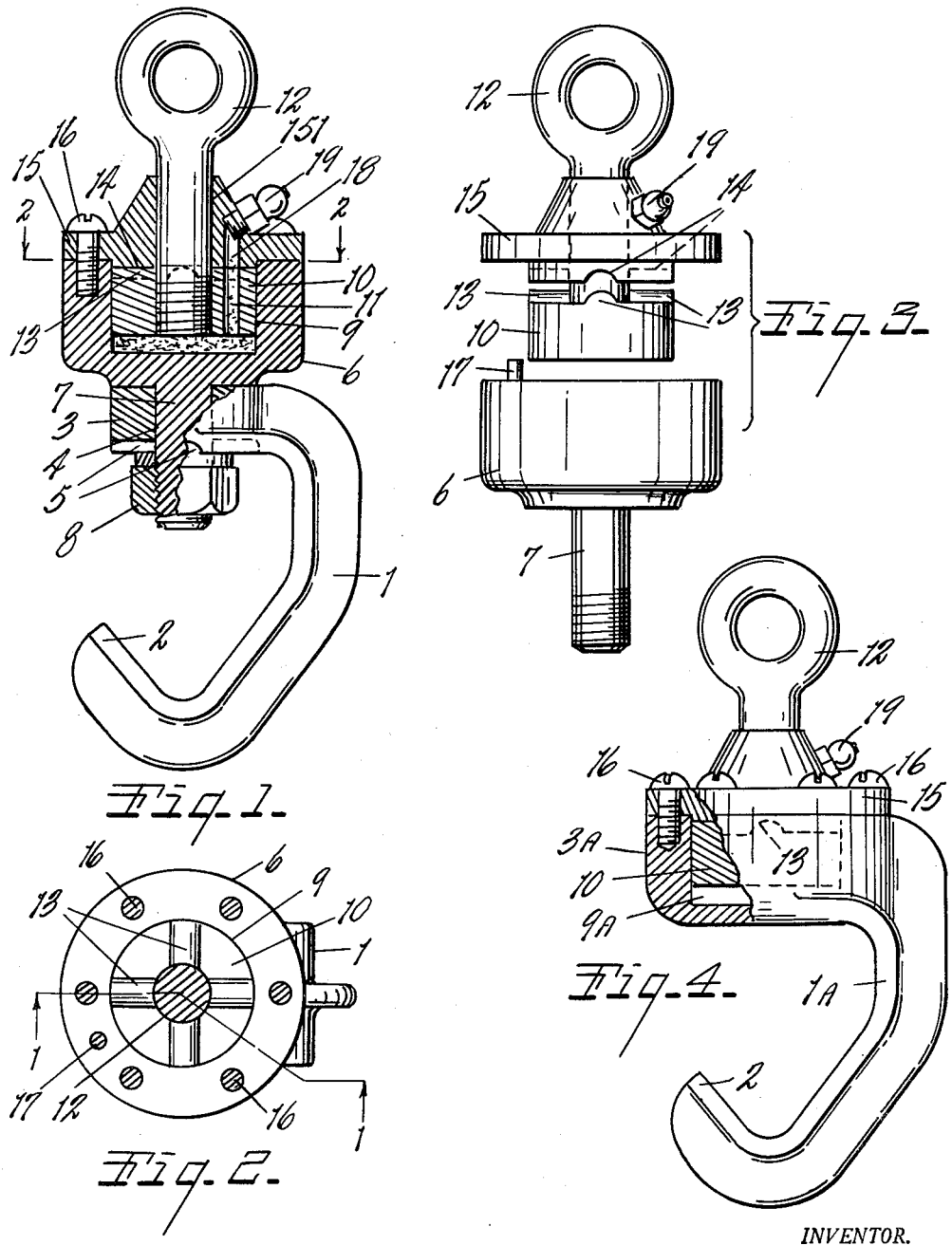

2,672,230

UNITED STATES PATENT OFFICE 2,672,230

SHIELDED SWIVEL MOUNT FOR CONVEYER HOOKS

Leonard A. E. Jetzke, Hartford, Mich.

Application June 9, 1951, Serial No. 230,732

1 Claim. (Cl. 198—177)

This invention relates to improvements in shielded swivel mount for conveyor hooks.

The principal objects of this invention are:

First, to provide a swivel suspension for the hooks on a chain conveyor which will not clog and stick as the result of spray paint accumulating on the swivel joint.

Second, to provide a swivel suspension for conveyor chain hooks in which the rotating joint is enclosed and lubricated to prevent paint or other materials sprayed against the conveyor from working into the rotating joint.

Third, to provide a swivel connection which may be applied as a conversion unit to existing conveyor chains or hooks, or incorporated in a new hook and swivel construction.

Fourth, to provide a lubricated swivel support for conveyor chain hooks in which rotation of the hooks on the chain causes a pumping action to continuously supply lubricant to the bearing portions of the swivel connection.

Other objects and advantages of my invention will be apparent from the following description and claims. The drawings, of which there is one sheet, illustrate two forms of my swivel support.

Fig. 1 is a side elevational view of a first form of my swivel support partially broken away in vertical cross-section along the plane of the line 1—1 in Fig. 2.

Fig. 2 is a transverse cross-sectional view through the swivel suspension taken along the plane of the line 2—2 in Fig. 1.

Fig. 3 is an exploded elevational view of the swivel suspension shown in Figs. 1 and 2 with the elements of the suspension in partially assembled position.

Fig. 4 is an elevational view of a modified form of hooks and suspension partially broken away in vertical cross section.

As is well known, most manufacturing processes include successive operations performed on the work at various locations, and it has become common practice to employ conveyor chains having hooks thereon for continuously advancing the work pieces through the manufacturing process. Some of the manufacturing steps include painting or coating the work with various materials and this has been accomplished by subjecting the work to a spray of the paint or coating material while the work is suspended on the conveyor. After being sprayed or coated the work is often advanced by the conveyor directly to a high temperature oven for baking the coating, and it has been found that a substantial quantity of the paint or coating accumulates on the hooks that suspend the work from the conveyor. This accumulation of paint is repeatedly baked on the hooks as they travel around the conveyor, building up undesirable deposits on the hooks and the hook suspensions. Many conveyor chain hooks are swivelly supported from the conveyor chain so that the hook can be rotated to open transversely or longitudinally of the axis of the conveyor depending upon the type of work to be suspended from the hook, and the position which the work is desired to assume relative to the conveyor. Locating detents have been provided in the hook suspensions to prevent accidental rotation of the hooks on the conveyor. These swivel connections and detents have been exposed to the spray of coating processes as described above, and it has been found that the swivel connections to the hooks rapidly become clogged and inoperative in certain instances. My invention overcomes the objectionable clogging or freezing up of the swivel suspension of conveyor hooks.

In Figs. 1 and 2 there is illustrated a well known type of conveyor hook 1 having a lower hooked end 2 and a transverse shank 3 that is vertically bored as at 4. The under surface of the shank 3 is transversely slotted as at 5 and in previous assemblies of this hook the slots 5 have coacted with ribs on a suspension plate to locate the hook rotatively on the plate.

Instead of extending the suspension bolt through the bore 4 I provided a housing 6 having a depending stud 7 that extends through the bore 4 and is secured to the shank by a nut 8. The housing and stud are tightly and nonrotatively clamped to the shank 3 of the hook. The upper surface of the housing 6 is vertically bored to form a chamber 9. In adapting the invention to existing conveyors and hooks, the diameter of the chamber 9 is desirably the same as the diameter of the suspension plate 10 that previously coacted with the under side of the shank 3, but this is not absolutely necessary. In any case a suspension plate is provided that will rotatively fit within the chamber 9, and the plate is vertically bored to form a grease passage as at 11.

The suspension plate 10 is centrally drilled and tapped to receive the upstanding eye-bolt 12 which may be the standard eye-bolt of existing hook structures. The top of the suspension plate is provided with transversely crossing ribs 13 which coact with transverse slots 14 formed on the under surface of a cap 15. The cap 15 is shaped to fit the top of the body 6 and is removably secured thereto by a plurality of screws 16. Desirably a locating pin 17 coacts between the body 6 and the cap 15 to orient the cap on the body. The cap 15 is centrally bored at 151 to rotatively receive the shank of the eye-bolt 12. The cap 15 is further bored as at 18 and provided with a grease fitting 19 so that a suitable grease or lubricant can be forced through the chamber 9 and around the suspension plate 10 after the swivel joint has been assembled.

From the foregoing construction it will be apparent that the hook 1 can rotate about the shank of the eye-bolt 12 by reason of the rotary engagement of the suspension plate 10 and the eye-bolt with the cap 15 and the inner walls of the chamber 9. This rotation is restrained by locking engagement between the ribs 13 and slots 14, and in order to rotate the hook it is necessary to lift the hook and the housing 6 until the slots 14 clear the ribs 13. All of the rotatively engaging surfaces are enclosed and are supplied with lubricant from the chamber 9. As the hook and housing are reciprocated in rotating the hook the suspension plate 10 acts as a piston to pump a little of the lubricant through the bore 11 and along the shank of the eye-bolt 12. Thus there is little chance for paint or other spray coatings to come in contact with or accumulate on the rotating bearing surfaces of the hook and suspension. If high temperature resistant greases or lubricants are used the suspension can be passed through bake ovens with the hook without detrimental effect, and the swivel joint in the suspension will at all times be free to rotate as desired.

In Fig. 4 I have illustrated a modified form of my swivel suspension in which the hook 1A is manufactured and shaped to incorporate features of the adapter body 6 in Fig. 1. Thus the chamber 9A is formed directly in the enlarged shank 3A of the hook rather than in a separate body as in Figs. 1 to 3. The cap 15, eye-bolt 12, and suspension plate 10 shown in Fig. 4 are the same as those shown in Figs. 1 to 3 and operate in the same manner. Obviously the construction shown in Fig. 4 is more desirable for newly constructed conveyors and hooks, while the structure shown in Figs. 1 to 3 is adapted for converting existing conveyors and hooks to my enclosed type of swivel suspension. Each form of the suspension prevents clogging or freezing of the swivel connection, and greatly reduces the costs of maintaining a conveyor chain and its hooks in operative condition.

Having thus described my invention, what I claim as new and desire to secure by Letters Patent is:

A conveyor hook having a transversely extending shank with an upwardly opening recess formed therein, a suspension plate rotatively received in said recess and capable of reciprocable non-tilting motion therein, a bolt removably secured to said plate and projecting upwardly from said recess, a cap secured to the top of said shank and extending around and across said recess to embrace said bolt and enclose said recess, the overlapping surfaces of said cap and said plate having coacting detent portions formed thereon, and means including a grease fitting carried by said cap for introducing a lubricant to said recess.

LEONARD A. E. JETZKE.

References Cited in the file of this patent
UNITED STATES PATENTS

| Number | Name | Date |
|---|---|---|
| 1,642,958 | Joyner | Sept. 20, 1927 |
| 1,713,835 | Krieg | May 21, 1929 |
| 1,773,045 | Koons | Aug. 12, 1930 |
| 1,848,548 | Richardson | Mar. 8, 1932 |
| 2,471,347 | Rayburn | May 24, 1949 |